(12) United States Patent
Keefe et al.

(10) Patent No.: US 12,128,712 B2
(45) Date of Patent: Oct. 29, 2024

(54) AVERAGE VOID DEPTH TRUCK TIRE WITH ANGLED RIBS HAVING DECOUPLED SHOULDER BLOCKS

(71) Applicant: Compagnie Generale des Etablissements Michelin, Clermont-Ferrand (FR)

(72) Inventors: Brian Joseph Keefe, Simpsonville, SC (US); Daniel McEachern Hicks, Greenville, SC (US); Virgile Ayglon, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 618 days.

(21) Appl. No.: 17/275,318

(22) PCT Filed: Nov. 13, 2019

(86) PCT No.: PCT/US2019/061176
§ 371 (c)(1),
(2) Date: Mar. 11, 2021

(87) PCT Pub. No.: WO2020/102350
PCT Pub. Date: May 22, 2020

(65) Prior Publication Data
US 2021/0323357 A1     Oct. 21, 2021

Related U.S. Application Data

(60) Provisional application No. 62/767,666, filed on Nov. 15, 2018.

(51) Int. Cl.
*B60C 11/03*     (2006.01)
*B60C 11/13*     (2006.01)

(52) U.S. Cl.
CPC .......... *B60C 11/13* (2013.01); *B60C 11/0302* (2013.01); *B60C 2011/0348* (2013.01);
(Continued)

(58) Field of Classification Search
CPC ................. B60C 11/0302; B60C 11/13; B60C 2011/0348
See application file for complete search history.

(56) References Cited

U.S. PATENT DOCUMENTS 2,104,532 A * 1/1938 Sommer ............. B60C 11/0311
152/DIG. 3
2,972,368 A * 2/1961 Williams ............ B60C 11/0306
152/209.16

(Continued)

FOREIGN PATENT DOCUMENTS

DE     102017203014 A1     8/2018
DE     102017203225 A1     8/2018
(Continued)

OTHER PUBLICATIONS

Machine translation for Japan 2003-205706 (Year: 2023).*
(Continued)

*Primary Examiner* — Steven D Maki
(74) *Attorney, Agent, or Firm* — Neal P. Pierotti

(57) ABSTRACT

A heavy truck tire tread with a rib (18) located between first (14) and second (16) tread grooves. A shoulder block (30) is adjacent the rib and at a shoulder edge of the tread, and a decouple groove (32) is present that decouples the shoulder block from the rib. The decouple groove is spaced from and free from engagement with the shoulder edge, and extends at least twice as long in the longitudinal direction than in the lateral direction. The width of the decouple groove is less than widths of the first and second tread grooves. The tread has an average void depth that does not go past a twenty (Continued)

percent line, where the twenty percent line is twenty percent of a full void depth located from an outer surface of the tread, and where the average void depth does not include decouple grooves and tread outboard from the decouple grooves.

15 Claims, 12 Drawing Sheets

(52) U.S. Cl.
CPC . *B60C 2011/036* (2013.01); *B60C 2011/0365* (2013.01); *B60C 2011/0367* (2013.01); *B60C 2200/06* (2013.01)

(56) References Cited

U.S. PATENT DOCUMENTS

| | | | | |
|---|---|---|---|---|
| 4,832,099 | A * | 5/1989 | Matsumoto | B60C 11/033 152/209.28 |
| D370,880 | S * | 6/1996 | Graas | D12/563 |
| D426,855 | S * | 6/2000 | Niwa | D12/563 |
| D451,448 | S * | 12/2001 | Maxwell | D12/565 |
| 2011/0168312 | A1* | 7/2011 | Pineau | B60C 11/0302 152/209.28 |
| 2015/0183273 | A1* | 7/2015 | Colombo | B60C 11/042 152/209.8 |

FOREIGN PATENT DOCUMENTS

| | | | |
|---|---|---|---|
| EP | 688685 A2 | * | 12/1995 |
| GB | 2224472 A | * | 5/1990 |
| JP | 08-058316 A | * | 3/1996 |
| JP | 2002-067621 A | * | 3/2002 |
| JP | 2003-205706 A | * | 7/2003 |

OTHER PUBLICATIONS

Machine translation for Japan 2002-067621 (Year: 2023).*
Machine translation for Japan 08-058316 (Year: 2023).*
European Patent Office; International Search Report and Written Opinion for patent application PCT/US2019/061176, filed Nov. 13, 2019; Publisher: European Patent Office, Rijswijk, Netherlands; Feb. 2, 2020; pp. 1-13, enclosed.

* cited by examiner

AVERAGE VOID DEPTH TRUCK TIRE WITH ANGLED RIBS HAVING DECOUPLED SHOULDER BLOCKS

CROSS-REFERENCE TO RELATED APPLICATIONS

The present application is a 35 U.S.C. § 371 application of PCT/US19/61176 filed on Nov. 13, 2019 and entitled "Average Void Depth Truck Tire with Angled Ribs Having Decoupled Shoulder Blocks." PCT/US19/61176 claims priority to U.S. patent application Ser. No. 62/767,666 filed on Nov. 15, 2018 and entitled "Average Void Depth Truck Tire with Angled Ribs Having Decoupled Shoulder Blocks." PCT/US19/61176 and U.S. Ser. No. 62/767,666 are incorporated by reference herein in their entireties for all purposes.

FIELD OF THE INVENTION

The subject matter of the present invention relates to a truck tire that has reduced abnormal tread wear. More particularly, the present application involves a tread that features an angled rib with a decoupled shoulder block that functions to reduce abnormal wear of the shoulder of the tread.

BACKGROUND OF THE INVENTION

Manufacturers of heavy commercial vehicle tires have made huge progress in developing tire architectures and tire materials that allowed them to increase the wear resistance of tire treads and reduce the rolling resistance of tires while in the same time improving their level of grip and resistance to road hazard. Tread patterns may include a series of circumferential grooves between which a series of circumferential ribs are positioned. The circumferential direction, which can also be described as the longitudinal direction, extends around the central axis of the tire and is oriented at a ninety degree angle to the lateral direction of the tire. The circumferential grooves and ribs extend 360 degrees around the tire and are oriented so that they have a component of extension in the longitudinal/circumferential direction but no component of extension in the lateral direction. A variation of tread patterns involves orienting the ribs and grooves so that they are not circumferential ribs and grooves, but rather include a component of extension in the lateral direction. In this regard, the tread grooves and ribs can extend from the shoulder edges inward in the lateral direction while at the same time extending some amount in the longitudinal direction to result in an "angled" orientation of these tread features.

The use of angled ribs and grooves achieves some advantages over tread designs that include only circumferential grooves and ribs. However, the use of angled grooves and ribs results in areas of wear on the outside portion of the ribs that occur at a faster rate than other areas of the rib and may propagate inward. The tire will then have a section that is worn faster than the rest or having irregular wear leading to complaints from the owner of the tire, reduced tire performance, and even early removal from service of the tire.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
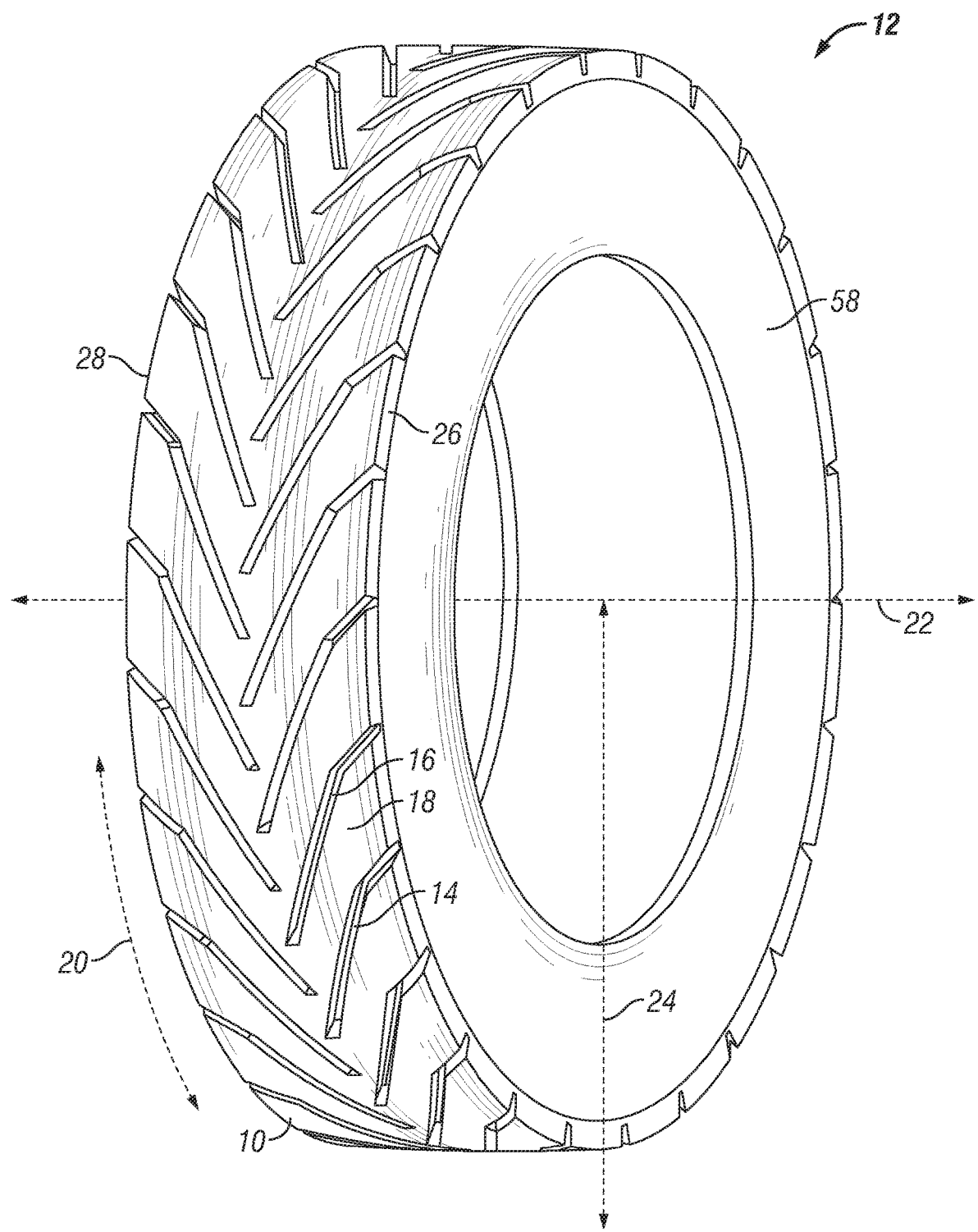
FIG. 1 is a perspective view of a heavy truck tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a tread 10 for a heavy duty truck tire 12 with angled grooves 14, 16 and ribs 18 that use a decouple groove 32 to decouple a shoulder block 30 from the rib 18. In this regard, the term "angled" means the grooves 14, 16 and rib 18 are oriented so as to have components of extension both in the longitudinal direction 20 and lateral direction 22. This decoupling of the shoulder bock 30 causes a more evenly worn interior portion of the shoulder block 30 to result in less abnormal wear of the tread 10. The decouple groove 32 can be variously configured so that it may connect to different sections of the angled grooves 14, 16, may be continuous or discontinuous, may have different cross-sectional shapes, and may be arranged at different angles to the longitudinal direction 20.

FIG. 1 shows a tire 12 that is a heavy duty truck tire 12. In this regard, the tire 12 is not designed for nor used with a car, motorcycle, or light truck (payload capacity less than 4,000 pounds), but is instead designed for and used with heavy duty trucks such as 18 wheelers, garbage trucks, or box trucks. The tire 12 may be a steer tire, a drive tire, a trailer tire, or an all position tire. The tire 12 includes a casing 58 onto which a tread 10 is disposed thereon. The tread 10 can be manufactured with the casing 58 and formed as a new tire 12, or the tread 10 can be a retread band that is attached to the casing 58 at some point after the casing 58 has already been used to form a retreaded tire 12. This is the case with all of the designs shown and described herein. They may all be tread designs of a brand new tire 12, or may be tread designs of a tread 10 for use in a retread tire 12. The central axis of the tire 12 extends through the center of the casing 58, and the lateral direction 22 of the tire 12 is parallel to the central axis. The radial direction 24, referred to also as the thickness direction 24, of the tire 12 is perpendicular to the central axis and the tread 10 is located farther from the central axis in the thickness direction 24 than the casing 58. The tread 10 extends all the way around the casing 58 in the circumferential direction 20, also referred to as the longitudinal direction 20, of the tire 12 and circles the central axis 360 degrees. The tread 10 includes a series of grooves and ribs that form a tread pattern. A rolling tread width extends in the lateral direction 22 from one shoulder edge 26 of the tread 10, or an opposite shoulder edge 28 of the tread 10. The rolling tread width represents that portion of the tread 10 that engages the ground through normal operation of the tire 12, and the shoulder edges 26, 28 may engage the ground as well as the area between these locations in the lateral direction 22.

Figure 2:
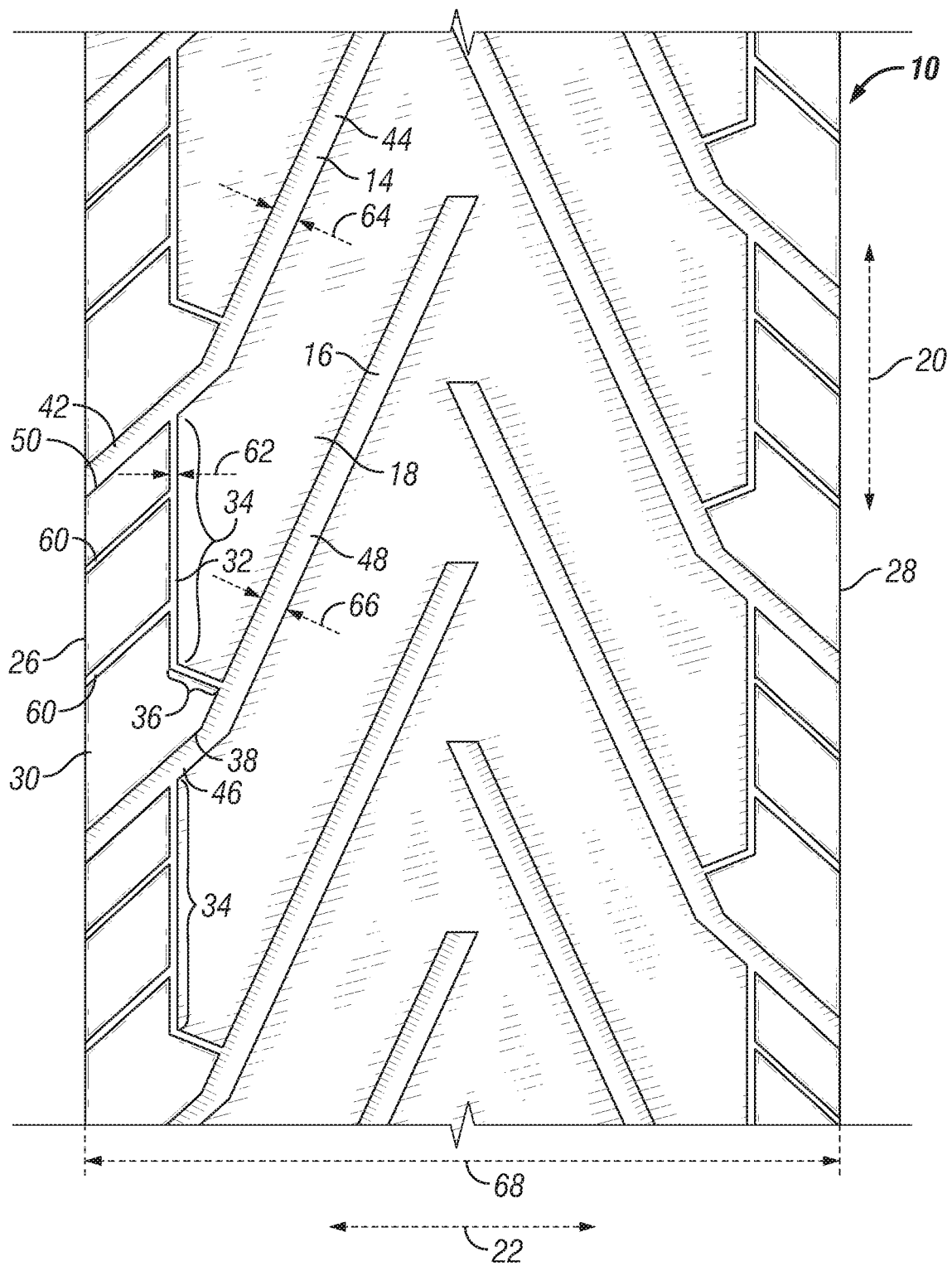
FIG. 2 is top view of tread in accordance with one exemplary embodiment.

FIG. 2 is a top view of a tread 10 that can be part of a tire 12 or a retread band that is produced and subsequently attached to a casing 58 to form a retread tire 12. The same tread pattern can repeat throughout the entire longitudinal length of the tread 10. The tread 10 has a first tread groove 14 and a second tread groove 16 that are in sequence next to one another in the longitudinal direction 20. The grooves 14, 16 can be variously shaped and have widths that can be greater than 2 millimeters. The shape of the center portion of the grooves 14, 16 can be different than the shape of the shoulder portion of the grooves 14, 16. A rib 18 is defined between the grooves 14, 16 in the longitudinal direction 20. The rib 18 is not a circumferential rib in that it does not extend all the way around the tread 10 in the longitudinal direction 20 when part of the tire 12. Instead, the rib 18 extends from the shoulder edge 26 to the center of the tread 10. The rib 18 is angled relative to the longitudinal direction 20 so that the rib 18 extends so as to have a component of extension in both the longitudinal direction 20 and in the lateral direction 22. In contrast, a circumferential rib would have a component of extension in the longitudinal direction 20 and no component of extension in the lateral direction 22.

The first tread groove 14 and the second tread groove 16 likewise are not circumferential grooves in that they extend so as to have a component of extension in both the longitudinal direction 20 and the lateral direction 22. The grooves 14, 16 may extend from the shoulder edge 26 and terminate at some point at or near the center of the tread 10. In other embodiments, the grooves 14, 16 and rib 18 need not start at the shoulder edge 26 and/or need not extend to the center. The groove 14, 16 may engage other grooves of the tread 10, and the rib 18 may engage other ribs of the tread 10 in other arrangements. The grooves 14, 16 and rib 18 have different components in the longitudinal and lateral directions 20, 22 along their lengths and as shown in FIG. 2 change angles once. In other embodiments, the grooves 14, 16 and rib 18 can have the same components of lateral and longitudinal extensions along their entire lengths. This would result in the grooves 14, 16 and rib 18 being straight in shape although angled relative to the longitudinal direction 20. In other arrangements, the grooves 14, 16 and rib 18 may curve or have two, three, four, or more angular changes along their lengths.

The first tread groove 14 has a first tread groove first segment 42 that extends inboard from the shoulder edge 26. The first tread groove 14 also has a first tread groove second segment 44 that extends inboard from the first tread groove first segment 42 and terminates near the center of the tread 10. The segments 42, 44 may have the same cross-sectional shape and size as one another, or they may differ. In the embodiment shown, the first and second segments 42, 44 are both linear in extension. The first tread groove first segment 42 is oriented a different amount in the lateral direction 22 than the first tread groove second segment 44. This difference in lateral direction 22 orientations causes the first tread groove 14 to have an angled shape. In a similar manner, the second tread groove 16 has a second tread groove first segment 46 that extends inboard from the shoulder edge 26 to a second tread groove second segment 48 that extends to and terminates near the center of the tread 10. Both segments 46, 48 are linear in shape and have the same size and cross-sectional shapes. The second tread groove first segment 46 is oriented in the lateral direction 22 differently than the lateral direction 22 orientation of the second tread groove second segment 48 to result in a second tread groove 16 that is angled in appearance. When the tread grooves 14, 16 have the same orientations in the longitudinal and lateral directions 20, 22 along their entire lengths, the segments 42, 44, 46, 48 need not be present.

The rib 18 is located between the first and second tread grooves 14 and 16 and can extend along to and terminate at the inboard most extensions of the grooves 14 and 16. The rib 18 could also be thought of as terminating at a groove that the grooves 14 and 16 intersect near the center of the tread 10, but such an intersecting groove is not shown in FIG. 2. Further, the rib 18 may in some embodiments extend beyond the grooves 14, 16 in the lateral and longitudinal directions 22, 20 until such time as the rib 18 terminates at the nearest groove, such as that shown in FIG. 2. The tread 10 has a shoulder block 30 that begins at, and is bounded by, the shoulder edge 26. The leading edge 50 of the shoulder block 30 is defined by the first tread groove 14, and in particular in the embodiment illustrated is defined by the first tread groove first segment 42. The trailing edge 38 of the shoulder block 30 is defined by the second tread groove 16, and in particular in the embodiment shown is defined by both the second tread groove first segment 46 and the second tread groove second segment 48. On the inboard side, the shoulder block 30 is defined by a decouple groove 32. The shoulder block 30 is located adjacent the rib 18 such that the rib 18 begins at and is bounded on its lateral outboard side by the decouple groove 32. The angled orientations of the first and second tread grooves 14, 16 may cause the rib 18 to likewise have an angled orientation.

The rolling tread width 68 extends from the shoulder edge 26 to shoulder edge 28 in the lateral direction 22 and is the portion of the tread 10 that engages the ground during operations of the tire 12. The rib 18 extends a large amount in the lateral direction 22. With respect to the rolling tread width 68, the rib 18 extends at least 30% of the length of the rolling tread width 68 in the lateral direction 22. As such, the rib 18 extends across at least 30% of the width of the rolling tread width 68 of the tire 12. This rib 18 design thus distinguishes it from a block or other smaller feature proximate to the shoulder edge 26.

The shoulder block 30 width may be 5%, 10%, 15%, or up to 20% of the rolling tread width, which are percentages of the width of the tread 10 from the shoulder edge 26 to shoulder edge 28 in the lateral direction 22. The shoulder block 30 may also be that section of the tread 10 that is bound by the shoulder edge 26, the first tread groove 14, the decouple groove 32, and the second tread groove 16. The decouple groove 32 is spaced from the shoulder edge 26, and is free from engagement with the shoulder edge 26. In this regard, the decouple groove 32 does not open into the shoulder edge 26, as would be the case with the first and second tread grooves 14, 16 illustrated that do in fact open into the shoulder edge 26. The decouple groove 32 in the illustrated embodiment opens into the first tread groove 14 and the second tread groove 16. The sipes 60 in FIG. 2 likewise open into the shoulder tread edge 26 in addition to opening into the decouple groove 32.

The decouple groove 32 has a width 62 that is less than a width 64 of the first tread groove 14. The width 62 is also less than the width 66 of the second tread groove 16. As the widths 62, 64, 66 could vary along the lengths of the grooves 14, 16, 32 the widths 62, 64, 66 can be calculated as the average of twenty points evenly spaced along the grooves 14, 16, 32. As an example, twenty locations along the decouple groove 32 are selected so that they are all the same distance from successive locations. The width across the decouple groove 32 is measured at these twenty locations to result in twenty numbers that are then added to one another to achieve a sum that is divided by twenty to result in an average width of the decouple groove 32 which is assigned as the width 62. The widths 64 and 66 can be calculated in a similar manner by taking the average of twenty evenly spaced locations along the lengths of the first and second tread grooves 14, 16. As the widths 62, 64, 66 could change in the thickness direction 24, the widths 62, 64, 66 should be measured at a consistent location in the grooves 14, 16, 32 such as at the surface of the tread 10, or half way into the depths of the grooves 14, 16, 32. In some instances, the widths 64 and 66 can be at least two times greater, at least three times greater, at least four times greater, or at least five times greater than width 62. In some instances the width 62 is less than or equal to 2 millimeters, and in other arrangements, the width 62 is greater than or equal to 2 millimeters, and in further embodiments the width 62 is from 1-3 millimeters, and in yet other embodiments the width 62 is from 0.5-4.0 millimeters. In some embodiments, the shoulder block 30 created or defined by the decouple groove 32 can have a width of 25 millimeters in the lateral direction 22.

The decouple groove 32 is oriented more in the longitudinal direction 20 than in the lateral direction 22. The decouple groove 32 may extend at least twice as long in the longitudinal direction 20 than in the lateral direction 22. In other arrangements, the decouple groove 32 can extend at least 3 times as long, at least 4 times as long, at least 5 times as long, at least 6 times as long, or at least 10 times as long in the longitudinal direction 20 than in the lateral direction 22. This measurement can be performed by locating the leading location of the decouple groove 32 in the longitudinal direction 20, and the trailing location of the decouple groove 32 in the longitudinal direction 20. In the FIG. 2 embodiment, the leading location would be where the decouple groove 32 opens into the first tread groove 14, and the tailing location would be where the decouple groove 32 opens into the second tread groove 16. These two points would be noted and a line can be drawn between them. The amount of extension of this line in the longitudinal direction 20 would be compared to the amount of extension of this line in the lateral direction 22 and the longitudinal extension would be at least two times as large as the lateral extension. In other arrangements, the ratios or limits would be as previously listed.

The decouple groove 32 in FIG. 2 is arranged so that it has a majority 34 of its length, and a minority 36 of its length. The majority 34 having a longer length than the minority 36. The majority 34 of the decouple groove 32 in this embodiment has a component of extension only in the longitudinal direction 20 and none in the lateral direction 22. The minority 36 of the decouple groove 32 has components of extension both in the longitudinal direction 20 and the lateral direction 22. The component of extension of the minority 36 in the lateral direction 22 is greater than the component of extension of the minority 36 in the longitudinal direction 20. The minority 36 extends from the majority 34 inboard in the lateral direction 22 and engages the second tread groove second segment 48. The majority 34 engages the first tread groove first segment 42. The decouple groove 32 is a single continuous groove that extends from the first tread groove 14 to the second tread groove 16. In other embodiments, the decouple groove 32 may include more than one groove and/or may be discontinuous between the two grooves 14, 16.

The shoulder block 30 includes a pair of sipes 60 that extend from the shoulder edge 26 to the decouple groove 32. The sipes 60 can be present within and angled within the shoulder block 30 so that they extend all the way across the shoulder block 30 without engaging the decouple groove 32. The sipes 60 are linear and angled to the longitudinal direction 20 and can be 2 millimeters or less in width. In other versions the sipes 60 are zig-zag in cross-sectional shape with tear drops at their bottoms, and may have varying widths. The width variations may be along the length of the sipes 60 and also along the depths of the sipes 60 in the thickness direction 24. The sipes 60 are not present in the rib 18, but may be present in any number, size, shape, and variation in the rib 18 or shoulder block 30 in accordance with other exemplary embodiments. Further, the sipes 60 need not be present in the shoulder block 30 in other arrangements.

The shoulder block 30, rib 18, decouple groove 32, first tread groove 14 and second tread groove 16 can be repeated across the entire tread 10 and in addition to being associated with the shoulder edge 26 can extend from and be associated with the shoulder edge 28. These elements can be the same as one another or may be different, and can be arranged as previously discussed so a repeat of this information is not necessary. As such, it is to be understood that the described elements of the tread 10 herein need not be located at just one particular location but can be at any area or location on the tread 10. Decoupling of the shoulder block 30 by the decouple groove 32 reduces or eliminates abnormal wear that may be present in the shoulder block 30 through the arrangements of the tread grooves 14, 16 and rib 18. Shoulder block 30 protects the interior portion of the rib 18 which would be the portion of the rib 18 inboard from the shoulder block 30 in the lateral direction 22. The shoulder block 30 will react differently to forces imparted thereon with the presence of the decouple groove 32 and will cause the adjacent portion of rib 18 to wear more evenly. The decouple groove 32 can be oriented along with the rib 18 and grooves 14, 16 so that a leading edge 50 of the shoulder block 30 is sized and shaped differently than a trailing edge 38 of the shoulder block 30. In this regard, the shoulder block 30 can have a wider portion on the trailing edge 38 to support adjacent areas on the tread 10.

Figure 3:
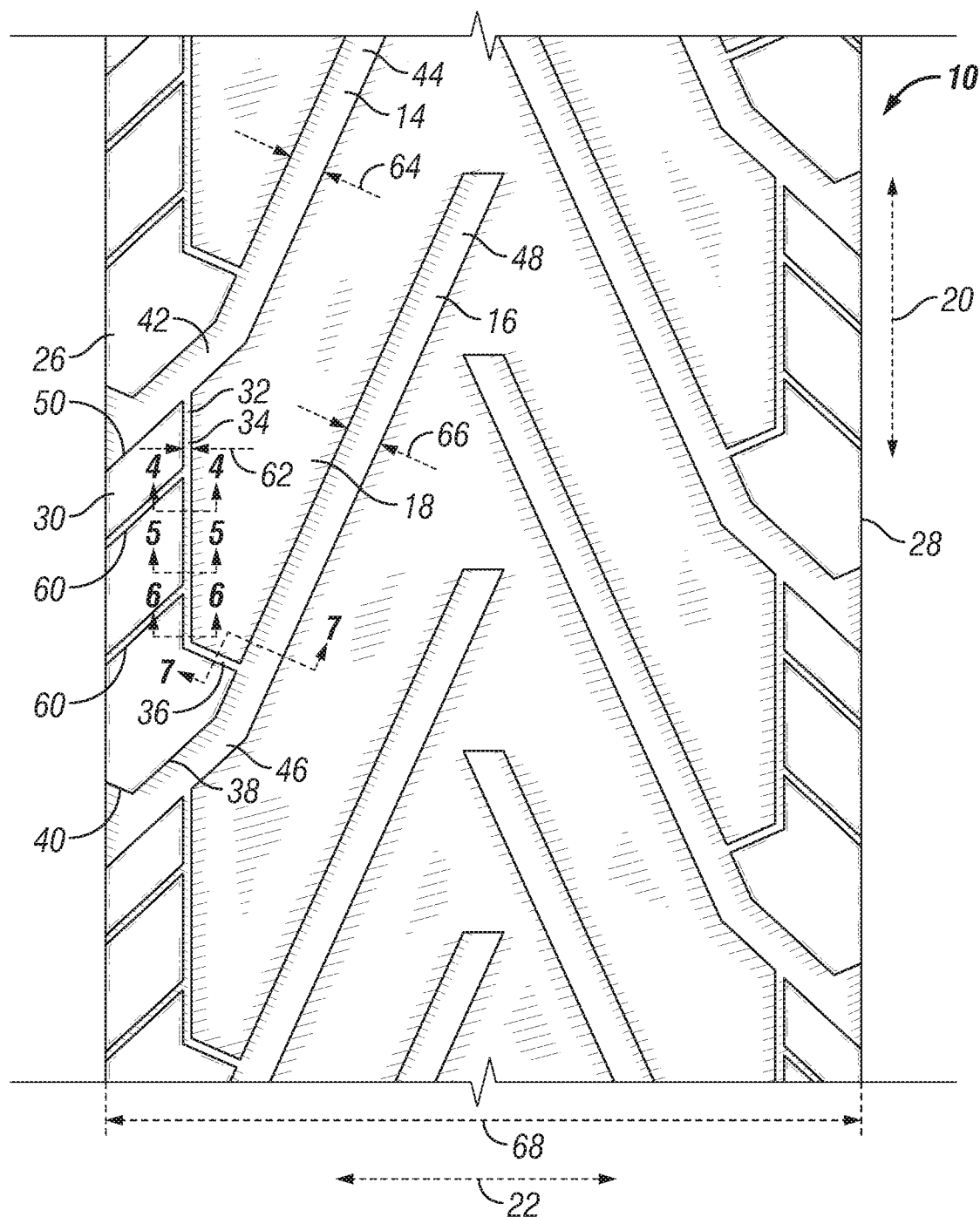
FIG. 3 is a top view of tread in accordance with another exemplary embodiment in which the shoulder blocks have a blunted feature.

FIG. 3 shows another embodiment of the tread 10 that includes first and second tread grooves 14, 16, rib 18, decouple groove 32, and shoulder block 30. These features can be arranged as previously discussed. The embodiment in FIG. 3 differs from that in FIG. 2 in that the trailing edge 38 of the shoulder block 30 includes a blunted feature 40. This blunted feature 40 causes the second tread groove 16 to open up at the shoulder edge 26, and the blunted feature 40 is at the shoulder edge 26 and extends from it inboard in the lateral direction 22 and along the longitudinal direction 20. In other designs, the blunted feature 40 has an orientation in only the lateral direction 22 and not in the longitudinal direction 20. The blunted feature 40 is distinguished from the non-blunted shoulder block 30 of FIG. 2 that has a trailing edge 38 that terminates at a point shaped like a triangle at the shoulder edge 26. The blunted feature 40 may be straight, or convex in shape, or curved in shape. The blunted feature 40 may cause the shoulder block 30 to experience less wear in the location near the shoulder edge 26. The blunted feature 40 can be described as a portion of the trailing edge 38 that has a component of extension in the longitudinal and lateral directions 20, 22 different than the rest of the majority of the trailing edge 38 and in some instances have a greater degree of extension in the lateral direction 22 than in the longitudinal direction 20.

Figure 4:
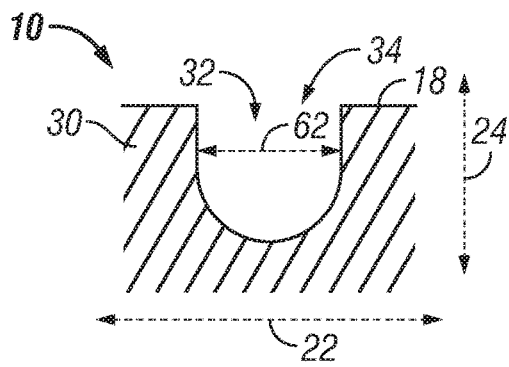
FIG. 4 is a cross-sectional view taken along line 4-4 of FIG. 3.
Figure 5:
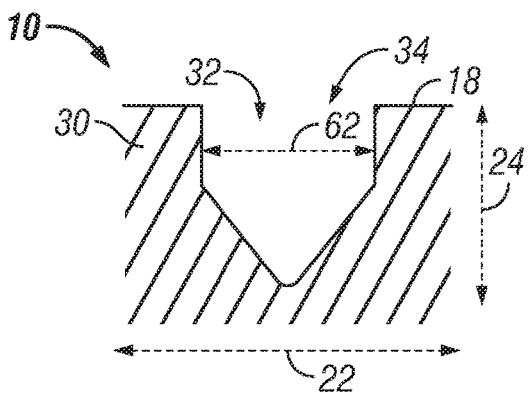
FIG. 5 is a cross-sectional view taken along line 5-5 of FIG. 3.
Figure 6:
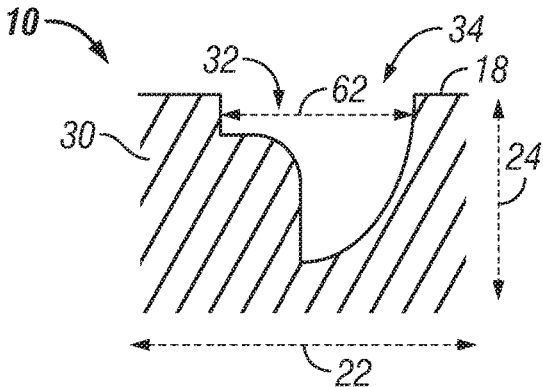
FIG. 6 is a cross-sectional view taken along line 6-6 of FIG. 3.

The decouple groove 32 may have the same size, depth, and cross-sectional shape along its entire length. Alternatively, the cross-section and/or size and/or depth of the decouple groove 32 may differ at any location along its length. The cross-section of the decouple groove 32 is shown at four different locations in FIGS. 4-7. In FIG. 4, the decouple groove 32 has a U-shaped cross-section below a rectangular shaped cross-section in the thickness direction 24. Further along the decouple groove 32 in the majority 34 section, the cross-section is V-shaped as shown in FIG. 5 in which the V-shaped portion is below a rectangular shaped portion in the thickness direction 24. Further along the decouple groove 32 in the majority 34 section, the cross-sectional shape changes so that one side is concave in cross-section at the bottom while the opposite side of the groove 32 is filled in by a stone ejector section or other portion effectively forming a step. This cross-section is shown in FIG. 6, and these areas are below a rectangular shaped area of the cross-section in the thickness direction 24. In other versions, the cross-section of the decouple groove 32 can be arranged so that protrusions that face one another extend in from the side walls of the decouple groove 32 and are spaced from one another, but may engage one another when this portion of the tire 10 enters the contact patch or otherwise has the appropriate forces acting thereon. Other portions of the majority 34 can likewise have different cross-sectional shapes such as zig-zag, tear drop, double tear drop, circular, or may have the shapes described.

Figure 7:
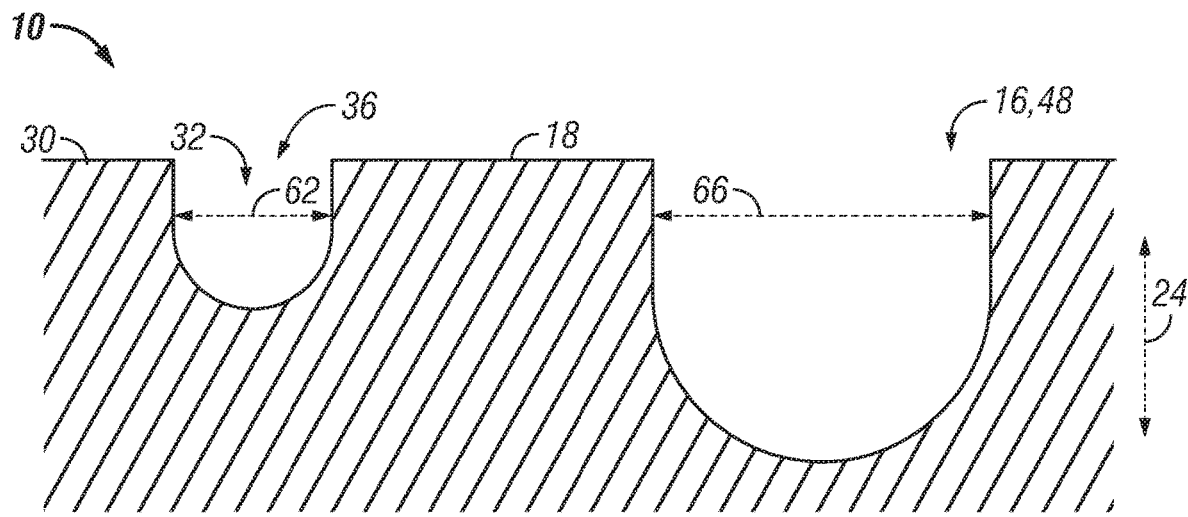
FIG. 7 is a cross-sectional view taken along line 7-7 of FIG. 3.

In FIG. 7, the minority 36 section of the decouple groove 32 has a cross-sectional shape and size that are the same as those of the decouple groove 32 at the FIG. 4 location. The cross-sectional shape of the second tread groove 16, and in particular the second tread groove second segment 48 is also shown and is a concave shape located below a rectangular shape in the thickness direction 24. The width 66 is greater than the width 62, and the second tread groove 16 is deeper than the decouple groove 32 in the thickness direction 24. In a similar manner, the first tread groove 14 can have the same cross-sectional shape as the second tread groove 16 and may likewise be deeper than the decouple groove 32 in the thickness direction 24. The difference in depth between the decouple groove 32 and the tread grooves 14, 16 can be to an extent that the decouple groove 32 is 0.2, 0.3, 0.4, 0.5, 0.6, 0.7, 0.8, 0.9, from 0.2-0.9, from 0.3-0.8, from 0.4-0.8, from 0.5-0.6, from 0.3-0.8, from 0.2-0.7, from 0.2-0.8, or up to 0.8 times the depth of the tread groove 14 or the tread groove 16. In some embodiments, the bottom of the decouple groove 32 is seven millimeters higher than the bottom of the second tread groove 16 in the thickness direction 24. The cross-sectional shape, size and depth of the decouple groove 32 in the minority 36 portion can be varied as that previously described with respect to the majority 34. In one embodiment, the minority 36 is zig-zag in cross-sectional shape with a tear drop at the bottom and has a width less than that of the majority 34 which has an elongated rectangular shape with a concave bottom having a flat at the lower most portion of the bottom. In this embodiment, the width of the minority 36 is varied along its length so that a zone is present that has a 0.2 millimeter to 0.4 millimeter width variation both along the length and thickness direction 24 of the minority 36.

Figure 8:
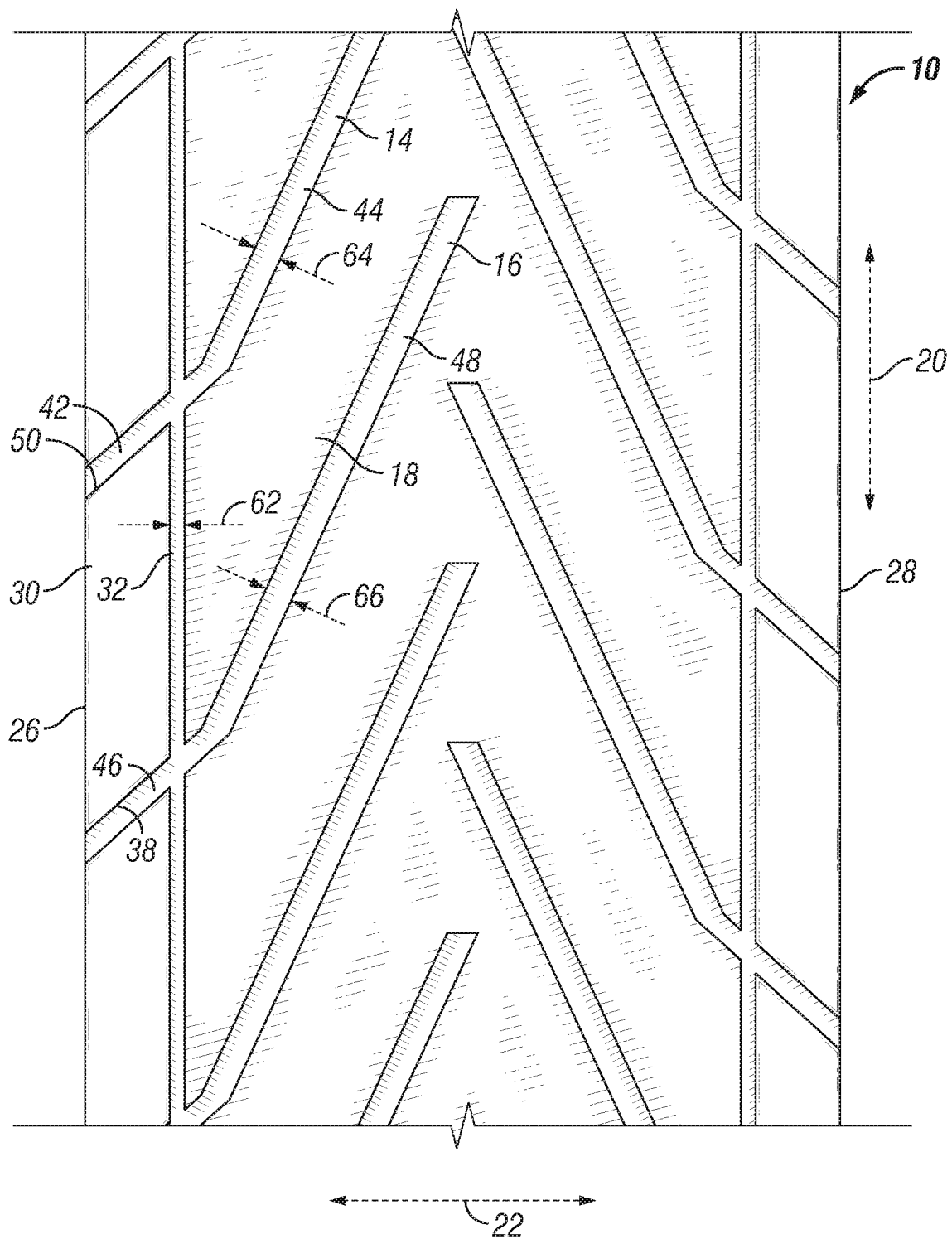
FIG. 8 is a top view of tread in accordance with another exemplary embodiment in which the decouple groove is straight along its entire length.

Another embodiment of the tread 10 is shown in FIG. 8 in which the decouple groove 32 is a straight groove that extends in the longitudinal direction 20 but does not have a component of extension in the lateral direction 22 such that the decouple groove 32 is completely oriented in the longitudinal direction 20. The decouple groove 32 is located inboard from the shoulder edge 26 in the lateral direction 22, and is located outboard in the lateral direction 22 from both the first tread groove second segment 44 and the second tread groove second segment 48. The decouple groove 32 engages both the first tread groove first segment 42 and the second tread groove first segment 46, and continuously extends between these segments 42, 46. The decouple groove 32 does not engage the first tread groove second segment 44 or the second tread groove second segment 48. No sipes 60 are present in the shoulder block 30. The sipes 60 are optional features that may or may not be present in the shoulder block 30 in other designs.

Figure 9:
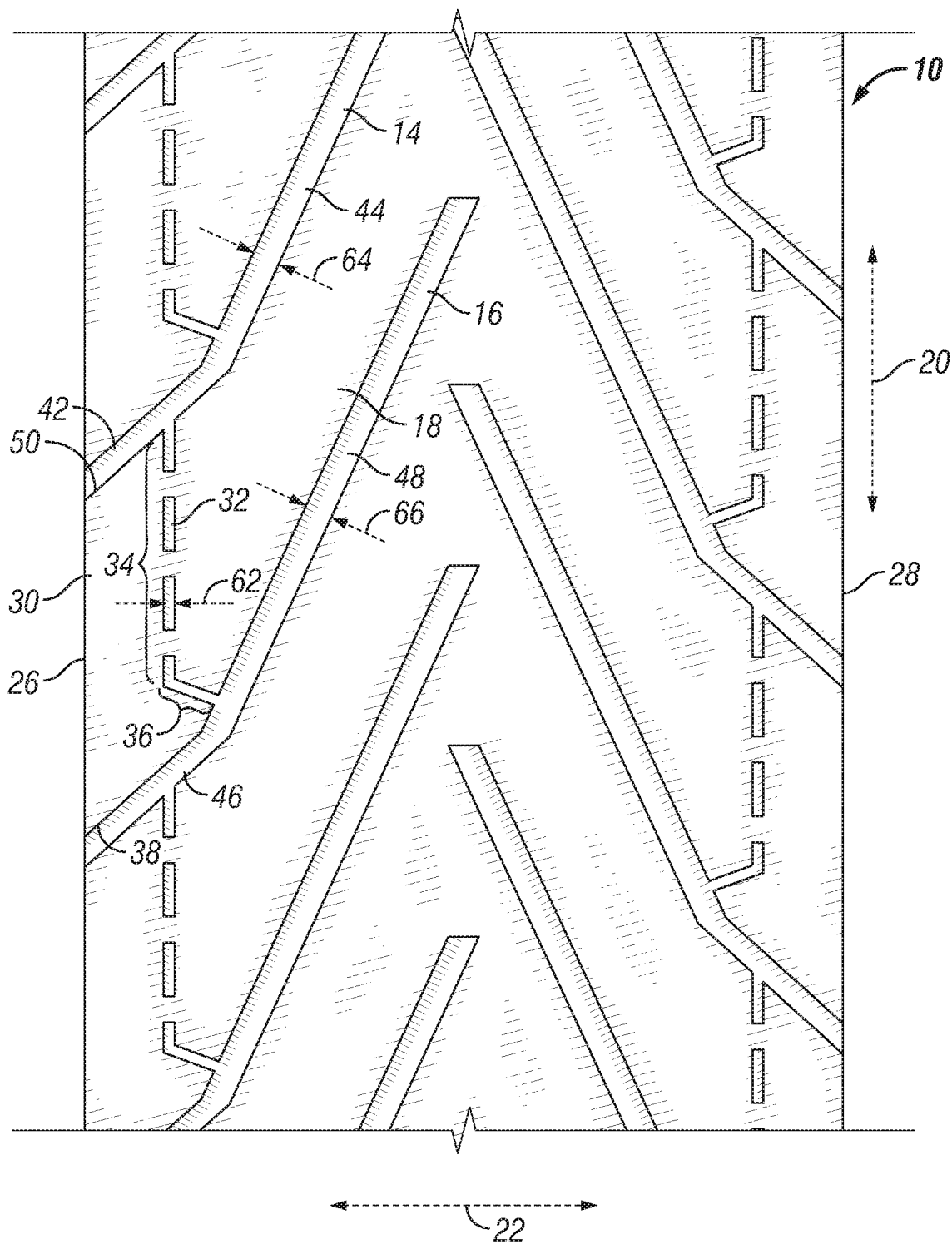
FIG. 9 is a top view of tread in accordance with another exemplary embodiment in which the decouple groove is a discontinuous.

FIG. 9 shows an embodiment of the tread 10 in which the decouple groove 32 is not continuous from the first tread groove 14 to the second tread groove 16. In this regard, the decouple groove 32 has sections that are grooves spaced between sections of the tread 10 that are rubber and do not include any grooves. Any number of groove sections can be present from one to ten or more. The groove sections of the decouple groove 32 need not be identical in cross-sectional size and shape but can be different between them. The discontinuous decouple groove 32 is shown as engaging both the first tread groove 14 and the second tread groove 16, but it need not engage both or even one of these grooves 14, 16 in other embodiments. For instance, the opening of the decouple groove 32 that touches the first tread groove 14 can instead not be present and the portion of this groove can stop short of the first tread groove 14 so that rubber is present between the first tread groove 14 and the open portion of the decouple groove 32. The decouple groove 32 has an open portion that engages the second tread groove 16 but it need not do so in other embodiment as the open portion may not engage it so that a closed section of the decouple groove 32 engages the second tread groove 16. The closed sections of the decouple tread groove 32 can be those portions of the tread 10 that extend from open section to open section, or from one of the tread grooves 14, 16 to the adjacent open section in order to evaluate the size and orientation of the decouple groove 32. Although configured as being discontinuous, the decouple groove 32 allows the shoulder block to still be decoupled from the rib 18. Although decoupled, the decouple groove 32 still extends at least twice as long in the longitudinal direction 20 than the lateral direction 22 and has a width 62 that is less than the widths 64, 66.

Figure 10:
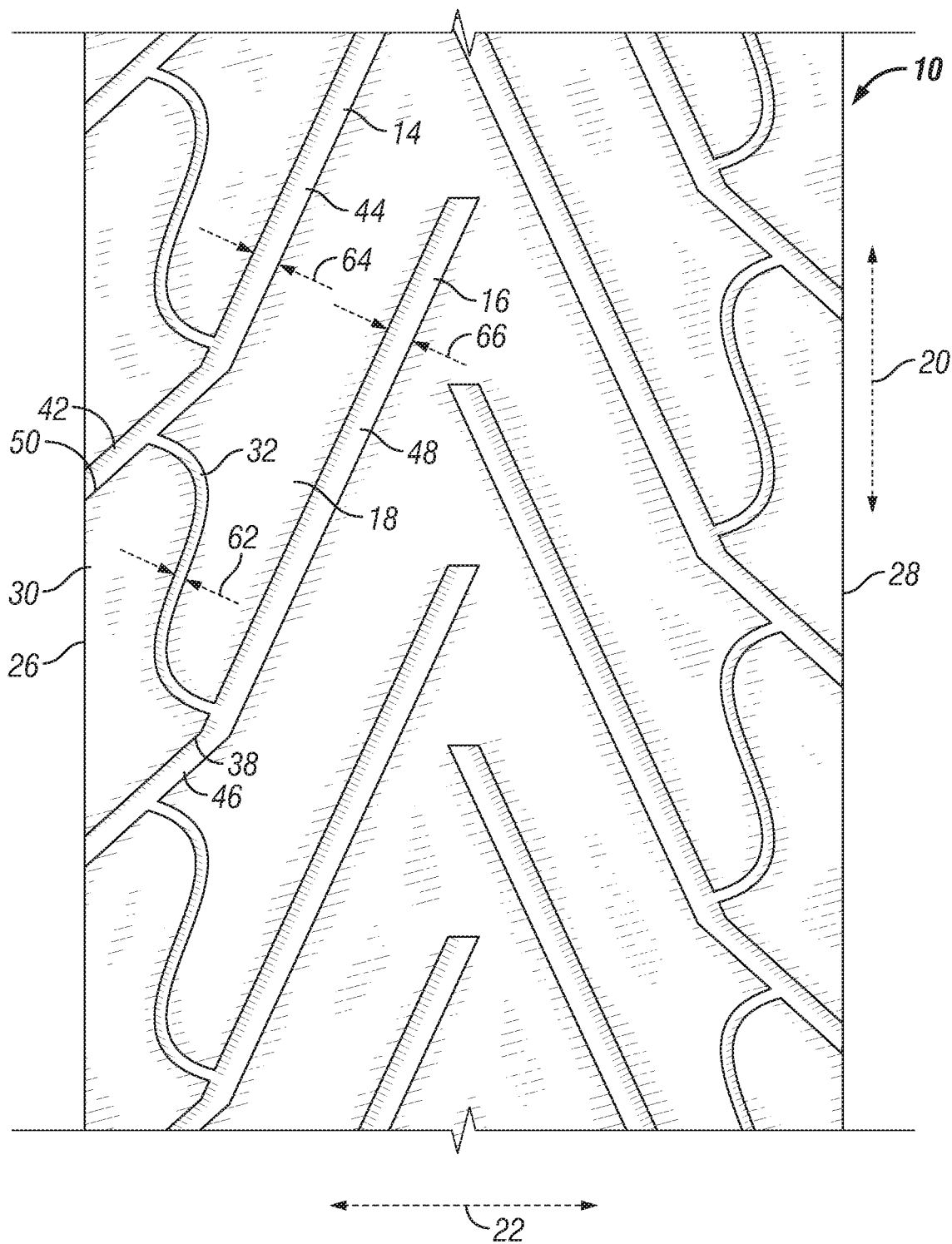
FIG. 10 is a top view of tread in accordance with another exemplary embodiment in which the decouple groove is wavy.

Another exemplary embodiment of the tread 10 is shown in FIG. 10 in which decouple groove 32 is not linear but instead has a curved shape. The shape of the decouple groove 32 can be wavy, sinusoidal, a single curve, angular, zig-zag, or variously shaped in accordance with different exemplary embodiments. The cross-sectional shape of the decouple groove 32 may be as that previously described in other versions of the tread 10.

Figure 11:
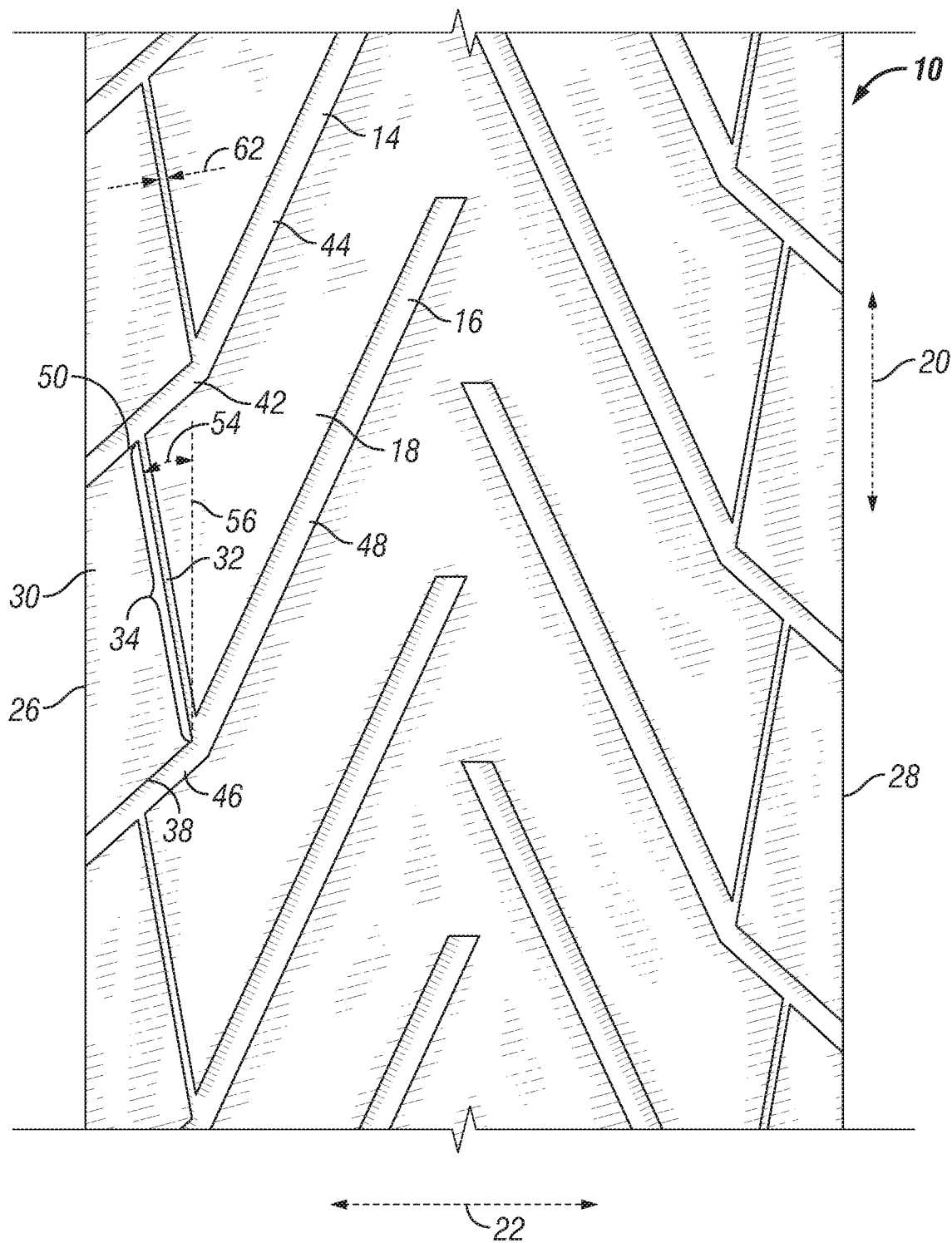
FIG. 11 is a top view of tread in accordance with another exemplary embodiment in which the decouple groove is at a non-zero angle to the longitudinal direction.

Another embodiment of the tread 10 is in FIG. 11 in which the decouple groove 32 is oriented in the longitudinal direction 20 but is not completely in the longitudinal direction 20 so as to have a component of orientation in the lateral direction 22. The decouple groove 32 extends from the second tread groove 16 to the first tread groove 14 and is oriented at an angle 54 to a line 56 that is parallel to the longitudinal direction 20. In instances in which the decouple groove 32 is not linear, the orientation of the decouple groove 32 with respect to the line 56 can be measured by drawing a straight line through the intersection points of the decouple groove 32 with the first and second tread grooves 14, 16. The line 56 runs through the point of engagement between the decouple groove 32 and the second tread groove 16. The angle 54 is not zero. The angle 54 may be from but not including zero to positive 10 degrees. The angle 54 is positive in FIG. 11 as a positive angle 54 is the extension of the decouple groove 32 outboard in the lateral direction 22 upon extension from the second tread groove 16 to the first tread groove 14. The angle 54 may also be from but not including zero to negative 10 degrees. The negative angle 54 is when the decouple groove 32 extends inboard in the lateral direction 22 away from the line 56. The decouple groove 32 can be set up so that a majority 34 of the decouple groove 32 is from ten degrees or less but not zero degrees to the longitudinal direction 20, which is parallel to the line 56. This arrangement would include both positive and negative orientations of the decouple groove 32. In some instances, the entire decouple groove 32 has the same shape and orientation so that a minority 36 portion is not present, but only the majority 34 as for example in FIG. 11.

The grooves 14, 16 may not extend all the way to the shoulder edges 26, 28. The tread 10 could be arranged so that the grooves 14, 16 are spaced inboard in the lateral direction 22 from the shoulder edges 26, 28 and this arrangement may be present in other embodiments of the tread 10. The grooves 14, 16 may or may not extend from the shoulder edges 26, 28 in the various embodiments, and may likewise be spaced from or not be spaced from the shoulder edges 26, 28 in the lateral direction 22 in accordance with various exemplary embodiments. In some instances, a shoulder block could be defined in the shoulder and be bound by two sipes, the shoulder edge 26, and the decoupled groove 32. The tread 10 may be arranged so that it completely lacks any grooves that are longitudinal grooves that extend 360 degrees about the tire 12 in the longitudinal direction 20. These 360 degree longitudinal grooves are discrete grooves and are more than one in number and extend the entire length around the tire 12 in the longitudinal direction 20. In some instances, the tread 10 is arranged so that it completely lacks any ribs that are longitudinal ribs that extend completely 360 degrees around the tire 12.

The measurements of all of the features herein such as grooves 14, 16, ribs 18 and decouple groove 32 are illustrated in relation to objects that are linear in shape. However, it may be the case that the grooves 14, 16, decouple groove 32, ribs 18 or other objects do not extend in a linear manner but instead are wavy, curved, zig-zag, or otherwise non-linear in shape. If the direction of the object is difficult to measure because of its shape, the main axis of the object can then be measured and this orientation assigned to the object. In some instances, a straight line can be drawn from the point the object begins to the point the object ends, and the orientation of this straight line can be measured and assigned as the orientation of the object of the tread 10.

Figure 12:
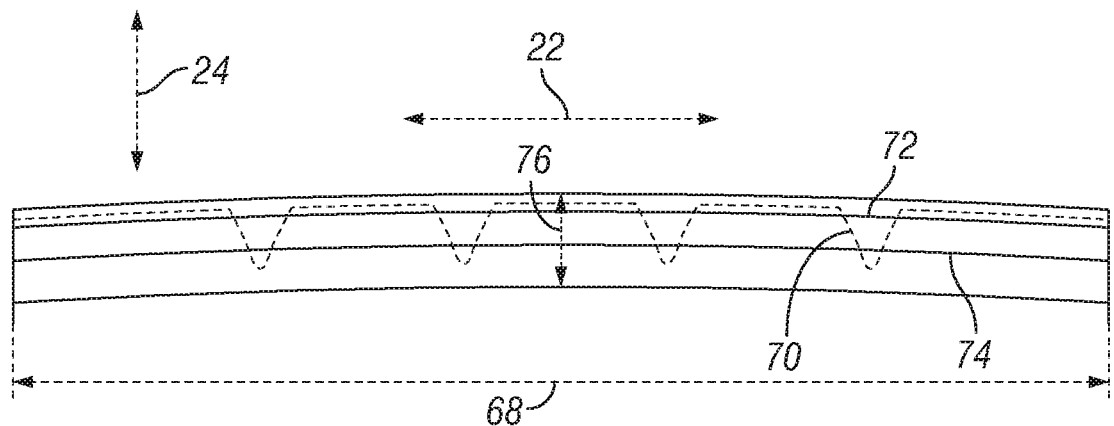
FIG. 12 is a graph of the average void depth for a tire that has four longitudinal grooves about its circumference.

The grooves 14, 16 have been described as being angled relative to the longitudinal direction 20. The grooves 14, 16 of the present tread 10 thus have a specific orientation relative to the longitudinal and lateral directions 20, 22. To further define this orientation of the grooves 14, 16 the tread 10 may be described in terms of an average void depth 70. FIG. 12 shows a cross-sectional view of the average void depth 70 taken around the tire. This average void depth 70 is depicted by a curve in the lateral direction 22 with different heights in the thickness direction 24 corresponding to the lateral and longitudinal features of the tire tread 10 such as sipes, block supports, stone ejectors, etc. The average void depth 70 is thus the average depth of tread at a particular location in the lateral direction 22 taken around the entire 360 degree circumferential length of the tread 10. If the tread 10 is provided in a band form for retreading, the average void depth 70 can be the average depth of the tread 10 at a particular location in the lateral direction 22 taken along the entire length of the band in the longitudinal direction 20.

A typical heavy truck tire with longitudinal grooves would have an average void depth 70 curve that contains portions extending from the tire tread 10 outer surface to beyond 60% of the full void depth. A twenty percent line 72 and a sixty percent line 74 are illustrated and denote the location in the thickness direction 24 in which twenty percent of the thickness direction 24 height of the tread 10 would otherwise be removed from the outer surface, and in which sixty percent of the thickness direction 24 height of the tread 10 would otherwise be removed from the outer surface. The full void depth 76 is the distance from the outer surface of the tread 10 to a curve that is transposed in the thickness direction 24 from the outer surface of tread 10 by a distance equal to the deepest point of the void of the tread 10. The twenty percent line 72 is twenty percent of the full void depth 76 down from the outer surface, and the sixty percent line 74 is sixty percent of the full void depth 76 down from the outer surface. In FIG. 12, the average void depth 70 is shown and the twenty and sixty percent lines 72, 74 are also present for reference. As shown, the tread 10 has four longitudinal grooves that extend around the entire circumference of the tread 10 in the longitudinal direction 20 and these four grooves are illustrated as the four greatest depressions, grooves in the average void depth 70. The average void depth 70 thus has portions that go past the twenty percent line 72 and that likewise go past the sixty percent line 74.

A heavy truck steer tire would have an average void depth 70 curve that greatly resembles the tire tread 10 and thus the longitudinal groove shapes. A typical heavy truck drive tire with longitudinal grooves and tread blocks would have an average void depth 70 curve similar to the steer tire example but with portions that are close to the tread 10 outer surface. This is because the tread blocks contain lateral grooves which increase the average depth around the tire. In some instances, a drive tire may have longitudinal grooves that have a wavy or zig-zag shape, thus some component in the lateral direction 22. Nevertheless the average void depth 70 curve will still have a portion or portions that extend beyond 60% of the full void depth 76.

Figure 13:
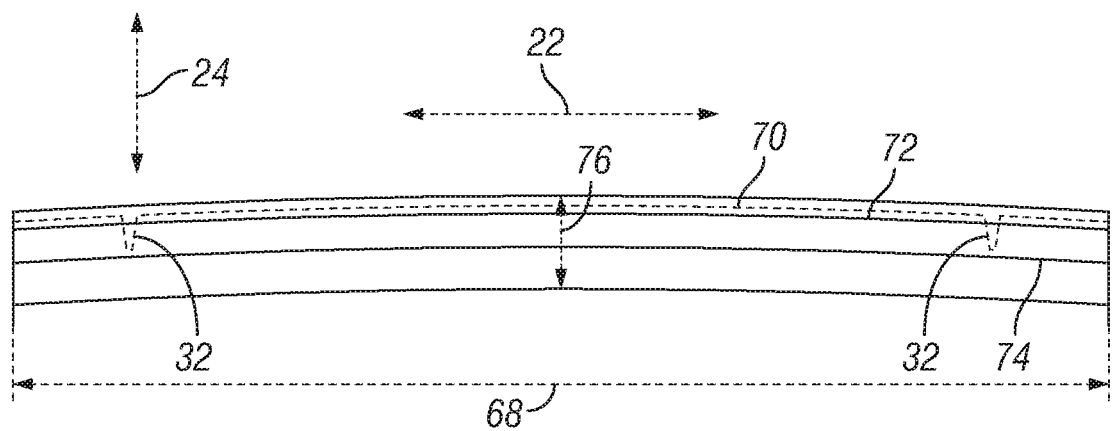
FIG. 13 is a graph of the average void depth for a tire that has angled grooves and ribs and a pair of decoupled grooves. The use of identical or similar reference numerals in different figures denotes identical or similar features.

FIG. 13 shows an average void depth 70 for a tread 10 that has angled grooves 14, 16 and ribs 18. A heavy truck tire with the angled grooves 14, 16 and ribs 18 has an average void depth 70 curve that is relatively flat and does not extend more than 20% of the full void depth 76. As such, the full void depth 76 does not go past the twenty percent line 72. There is an exception to this rule in that if the tread 10 includes one or more decoupled grooves 32, then the average void depth 70 would extend past the twenty percent line 72. Further, the average void depth 70 outboard of the two decoupled grooves 32 to the tread edges in the lateral direction 22 could likewise extend past the twenty percent line 72 due to openings being present in the tread 12 at these locations. Decoupled grooves 32 are grooves that extend primarily in the longitudinal direction and function to decouple a shoulder block of the tread 10 from an adjacent rib or other feature as discussed herein. Therefore, there may be decouple grooves 32 on either side of the tread 10 to decouple the shoulder blocks on either side of the tread 10. The decouple grooves 32 do not count for purposes of the average void depth 70 going past the twenty percent line 72 and thus are ignored in FIG. 13. In addition, none of the average void depth 70 outboard of these decouple grooves 32 is considered in evaluating the average void depth. As such, it is to be understood that as defined herein the average void depth 70 does not include decouple grooves 32 and the tread outboard of these decouple grooves 32 in the lateral direction 22 if they are present. The rest of the average void depth 70 as shown in FIG. 13 does not go past the twenty percent line 72. With the decouple grooves 32 present, the rest of the average void depth 70 that is considered is the average void depth 70 between the decouple grooves 32 in the lateral direction 22.

Figure 14:
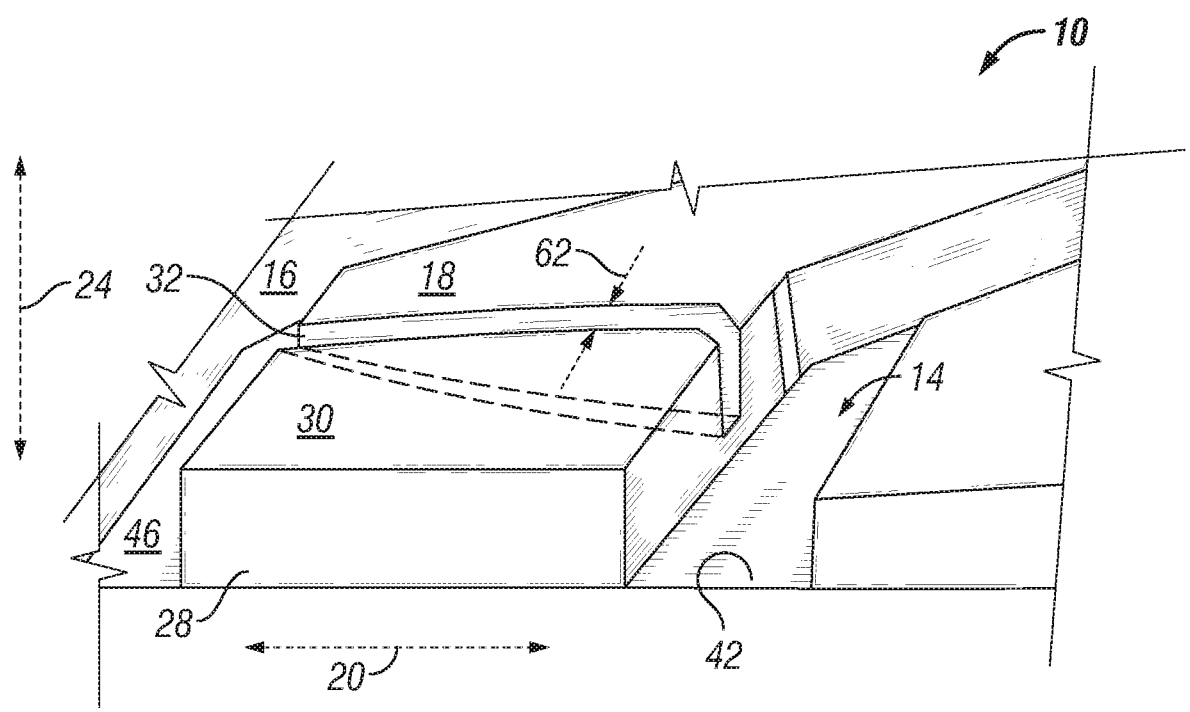
FIG. 14 is a perspective view of a portion of the side of the tread showing a variable depth decouple groove.

FIG. 14 shows a portion of the side of the tread 10 in perspective view. The decouple groove 32 has a variable depth in the thickness direction 24. The decouple groove 32 extends from the first tread groove 14 to the second tread groove 16. The depth of the decouple groove 32 varies at a constant rate along its entire length such that no two portions of the decouple groove 32 have the same depth. In other version, the decouple groove 32 may have a depth that is the same along some portions, but different along one or more other portions. As such, the variable depth can be constant at all portions or varying between less than all points of the decouple groove 32. The width 62 may be constant along the entire length of the decouple groove 32. In yet other embodiments, the depth of the decouple groove 32 into the tread 10 in the thickness direction 24 is constant along the entire length of the decouple groove 32.

Figure 15:
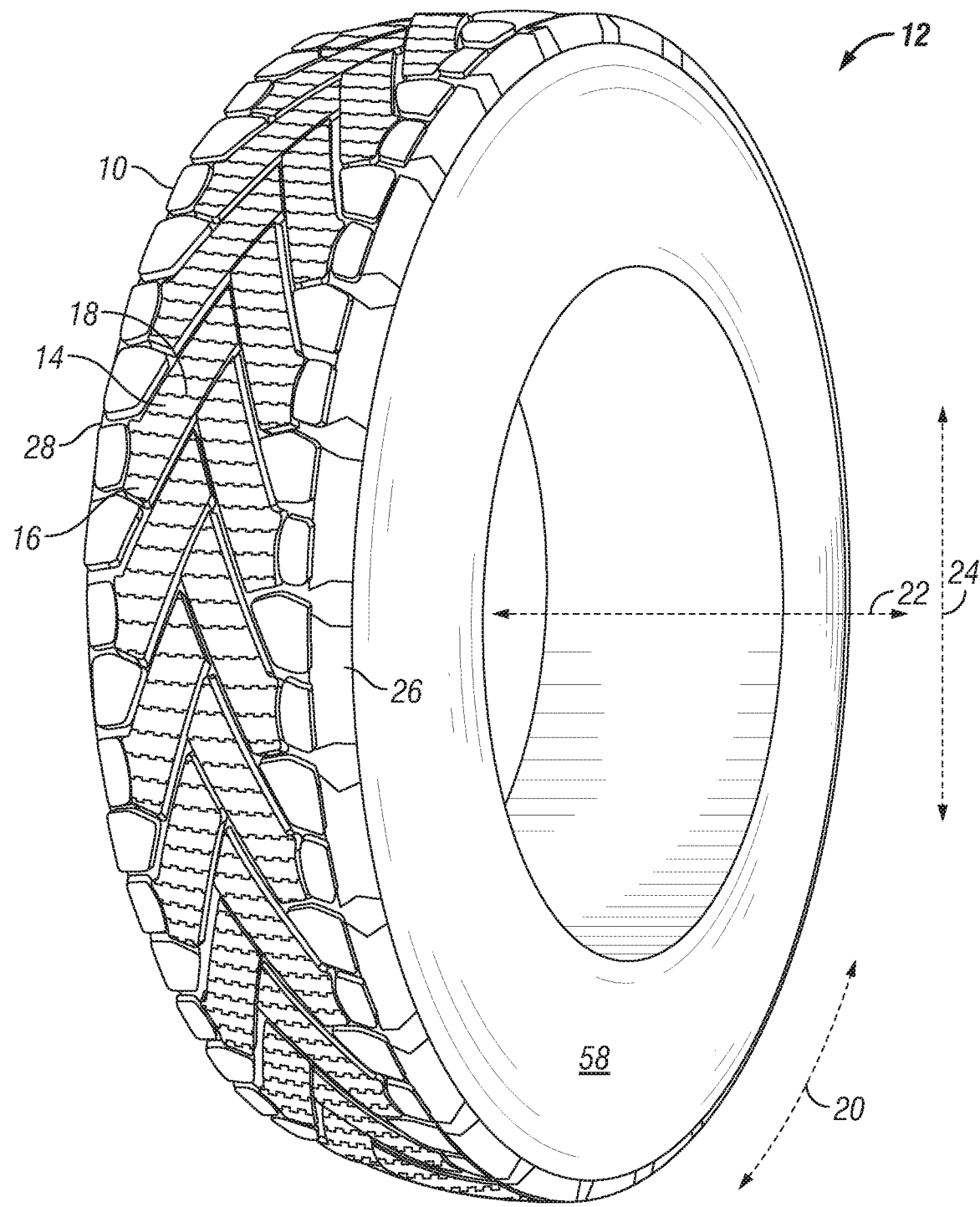
FIG. 15 is a perspective view of a tread in accordance with another exemplary embodiment.
Figure 16:
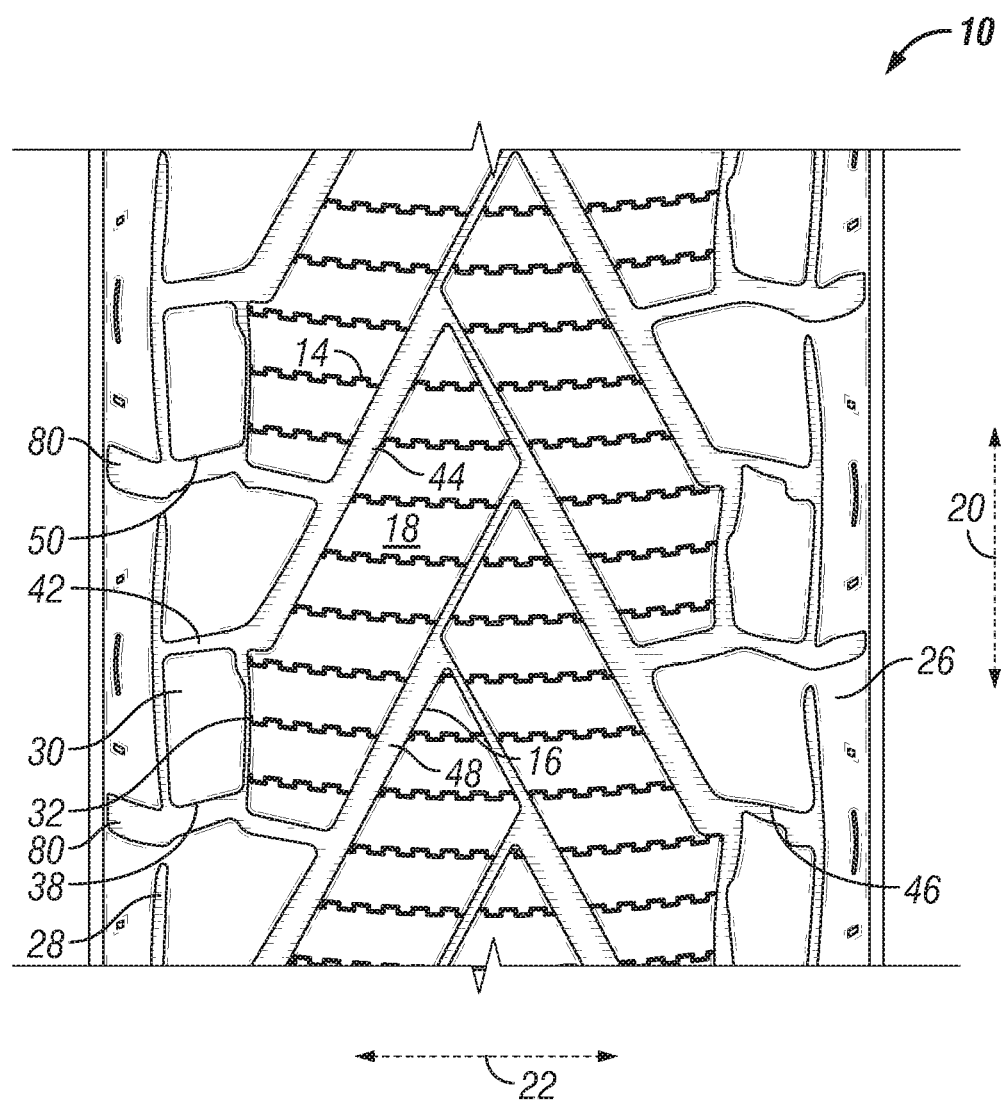
FIG. 16 is a top view of a portion of the tread of FIG. 15.

FIGS. 15 and 16 show another exemplary embodiment of the tread 10 incorporated into a tire 12. The ribs 18, first tread groove 14, second tread groove 16 and other features of the tread 10 may be provided as previously discussed and a repeat of this information is not necessary. The shoulder block 30 is decoupled by way of the decoupling groove 32 that is not continuous in the longitudinal direction 20. The tread 10 is different than previously illustrated and described embodiments in that openings 80 that extend inward from the shoulder edges 26, 28 are present which cause the tread 10 to have more void space in the shoulder bock 30 than in other areas of the tread 10. The large openings 80 in the shoulder blocks 30 thus function to cause the average void depth 70 to go below the twenty percent line 72 when measured. However, due to the presence of the decoupling grooves 32, the average void depth 70 is measured from one decoupling groove 32 to the other in the lateral direction 22, and the average void depth 70 at the decoupling grooves and of the tread outboard of the decoupling grooves 32 in the lateral direction 22 are not counted. When described herein as being "outboard" of the decoupling groove 32, it is to be understood that the decoupling grooves 32 are positioned next to shoulder edges 26, 28 and are thus generally disposed on opposite sides of the tread 10 in the lateral direction 22. The "outboard" portion of the tread 10 are those portions of the tread 10 immediately adjacent the decoupling grooves 32 and extending outboard in the lateral direction 22. In effect, the outboard portion of the tread 10 from one of the decoupling grooves 32 is the shoulder bock 30 defined by that particular decoupling groove 32 or portions of the tread 10 right next to and outboard of the decoupling groove 32 and not across the centerline of the tread 10 in the lateral direction 22.

The description of the tread 10 with respect to the average void depth 70 can also be defined in another manner The tread 10 can have a centerline in the lateral direction 22, which in effect splits the tread 10 up into a left half and a right half. The average void depth 70 of the tread 10 does not go past the twenty percent line 72 inboard from the decouple groove 32 in the lateral direction 22 to the centerline. The average void depth 70 could go past the twenty percent line 72 at the decouple groove 32 and/or outboard of the decouple groove 32 in the lateral direction 22 to the shoulder edge 26 or 28 (depending on which side of the tread 10 the decouple groove 32 is positioned). In this regard, the average void depth 70 inboard of the decouple grooves 32 does not go past the twenty percent line 72, while the average void depth 70 at and/or outboard of the decouple grooves 32 may or may not go past the twenty percent line 72.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire tread, comprising:
   a first tread groove;
   a second tread groove;
   a rib located between the first tread groove and the second tread groove, wherein the first tread groove and the second tread groove define a pair of tread grooves, wherein the tread has a longitudinal direction, a lateral direction, and a thickness direction, wherein the pair of tread grooves and the rib are not oriented completely in the longitudinal direction so as to extend in both the longitudinal direction and the lateral direction;
   a shoulder block adjacent the rib and at a shoulder edge of the tread; and
   a decouple groove that decouples the shoulder block from the rib, wherein the decouple groove is spaced from and free from engagement with the shoulder edge of the tread, wherein the decouple groove extends at least twice as long in the longitudinal direction than in the lateral direction, wherein a width of the decouple groove is less than a width of the first tread groove, and wherein the width of the decouple groove is less than a width of the second tread groove;

wherein the tread has an average void depth that does not go past a twenty percent line, wherein the twenty percent line is twenty percent of a full void depth located from an outer surface of the tread, wherein the average void depth does not include decouple grooves and does not include the tread outboard from the decouple grooves in the lateral direction;

wherein a majority of the decouple groove has a component of extension only in the longitudinal direction and has no component of extension in the lateral direction;

wherein a minority of the decouple groove has a component of extension in the lateral direction and a component of extension in the longitudinal direction, wherein the component of extension of the minority of the decouple groove in the lateral direction is greater than the component of extension of the minority of the decouple groove in the longitudinal direction.

2. A heavy truck tire tread, comprising:
a first tread groove;
a second tread groove;
a rib located between the first tread groove and the second tread groove, wherein the first tread groove and the second tread groove define a pair of tread grooves, wherein the tread has a longitudinal direction, a lateral direction, and a thickness direction, wherein the pair of tread grooves and the rib are not oriented completely in the longitudinal direction so as to extend in both the longitudinal direction and the lateral direction;
a first shoulder block adjacent the rib and at a shoulder edge of the tread; and
a decouple groove that decouples the first shoulder block from the rib, wherein the decouple groove is spaced from and free from engagement with the shoulder edge of the tread, wherein the decouple groove extends at least twice as long in the longitudinal direction than in the lateral direction, wherein a width of the decouple groove is less than a width of the first tread groove, and wherein the width of the decouple groove is less than a width of the second tread groove;
wherein the tread has an average void depth that does not go past a twenty percent line, wherein the twenty percent line is twenty percent of a full void depth located from an outer surface of the tread, wherein the average void depth does not include decouple grooves and does not include the tread outboard from the decouple grooves in the lateral direction;
second shoulder block that is decoupled from the rib completely by the first tread groove and not the decouple groove.

3. A heavy truck tire tread, comprising:
a first tread groove that has a first tread groove first segment that extends from a shoulder edge, wherein the first tread groove has a first tread groove second segment that extends from the first tread groove first segment, wherein the first tread groove first segment is oriented in a lateral direction a different amount than the orientation of the first tread groove second segment in the lateral direction;
a second tread groove that has a second tread groove first segment that extends from the shoulder edge, wherein the second tread groove has a second tread groove second segment that extends from the second tread groove first segment, wherein the second tread groove first segment is oriented in the lateral direction a different amount than the orientation of the second tread groove second segment in the lateral direction;
a rib located between the first tread groove and the second tread groove, wherein the first tread groove and the second tread groove define a pair of tread grooves, wherein the tread has a longitudinal direction, the lateral direction, and a thickness direction, wherein the pair of tread grooves and the rib are not oriented completely in the longitudinal direction so as to extend in both the longitudinal direction and the lateral direction;
a shoulder block adjacent the rib and at the shoulder edge of the tread; and
a decouple groove that decouples the shoulder block from the rib, wherein the decouple groove is spaced from and free from engagement with the shoulder edge of the tread, wherein the decouple groove extends at least twice as long in the longitudinal direction than in the lateral direction, wherein a width of the decouple groove is less than a width of the first tread groove, and wherein the width of the decouple groove is less than a width of the second tread groove, wherein the decouple groove extends to the first tread groove first segment and extends to the second tread groove second segment, wherein a majority of the decouple groove has a component of extension only in the longitudinal direction and has no component of extension in the lateral direction;
wherein a minority of the decouple groove has a component of extension in the lateral direction and a component of extension in the longitudinal direction, wherein the component of extension of the minority of the decouple groove in the lateral direction is greater than the component of extension of the minority of the decouple groove in the longitudinal direction;
wherein the tread has an average void depth that does not go past a twenty percent line, wherein the twenty percent line is twenty percent of a full void depth located from an outer surface of the tread, wherein the average void depth does not include decouple grooves and does not include the tread outboard from the decouple grooves in the lateral direction.

4. The tread as set forth in claim 3, wherein the decouple groove is a continuous groove that extends from the first tread groove to the second tread groove.

5. The tread as set forth in claim 3, wherein the decouple groove is discontinuous such that the decouple groove does not extend continuously from the first tread groove to the second tread groove.

6. The tread as set forth in claim 3, wherein the shoulder block has a trailing edge that defines a portion of the second tread groove, wherein the trailing edge has a blunted feature.

7. The tread as set forth in claim 3, wherein the first tread groove first segment extends in a linear direction from the shoulder edge, wherein the first tread groove second segment extends in a linear direction from the first tread groove first segment;
wherein the second tread groove first segment extends in a linear direction from the shoulder edge, wherein the second tread groove second segment extends in a linear direction from the second tread groove first segment;
wherein the first tread groove first segment and the first tread groove second segment result in an angled shape of the first tread groove, wherein the second tread groove first segment and the second tread groove second segment result in an angled shape of the second tread groove.

8. The tread as set forth in claim 7, wherein the shoulder block has a leading edge that defines a portion of the first tread groove first segment and no portion of the first tread groove second segment, and wherein the shoulder block has a trailing edge that defines a portion of the second tread groove first segment and that defines a portion of the second tread groove second segment.

9. The tread as set forth in claim 3, wherein the first tread groove is deeper than the decouple groove in the thickness direction, and wherein the second tread groove is deeper than the decouple groove in the thickness direction.

10. The tread as set forth in claim 3, wherein the decouple groove has a width that is from 2 millimeters to 3 millimeters.

11. The tread as set forth in claim 3, wherein the decouple groove has a width that is from 0.5 millimeter to 4 millimeters.

12. The tread as set forth in claim 3, wherein the decouple groove has a constant cross-sectional shape along the entire length of the decouple groove.

13. The tread as set forth in claim 3, wherein the decouple groove has a cross-sectional shape that is different at different locations along the length of the decouple groove.

14. The tread as set forth in claim 3, wherein the decouple groove has a variable depth in the thickness direction along a length of the decouple groove.

15. A heavy truck tire that has the tread of claim 3.

\* \* \* \* \*